No. 638,137. Patented Nov. 28, 1899.
W. O. PHILLIPS.
WHEELED HARROW.
(Application filed Jan. 20, 1899.)
(No Model.)
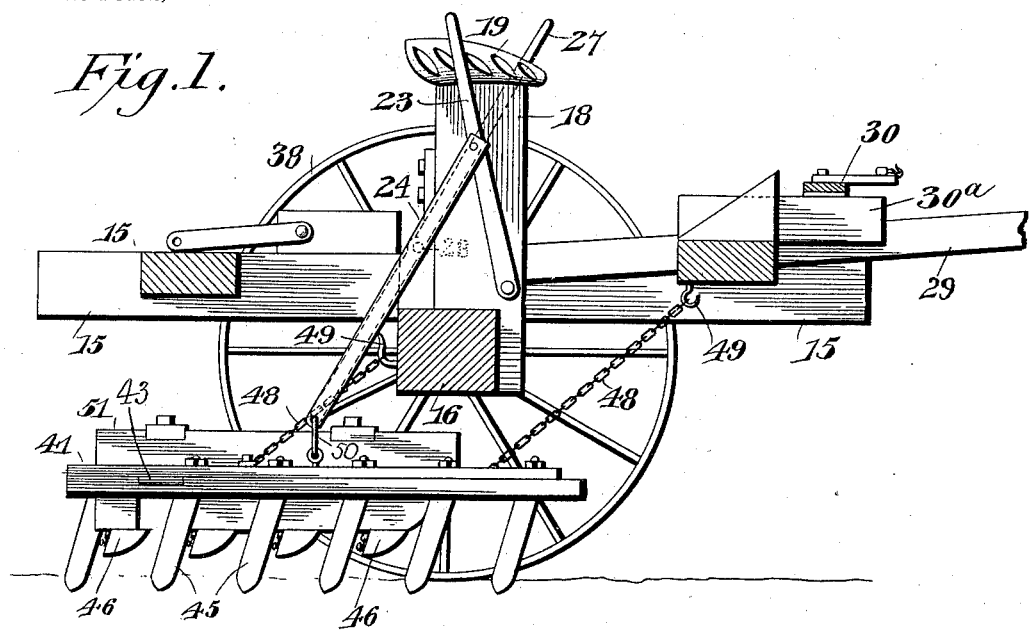
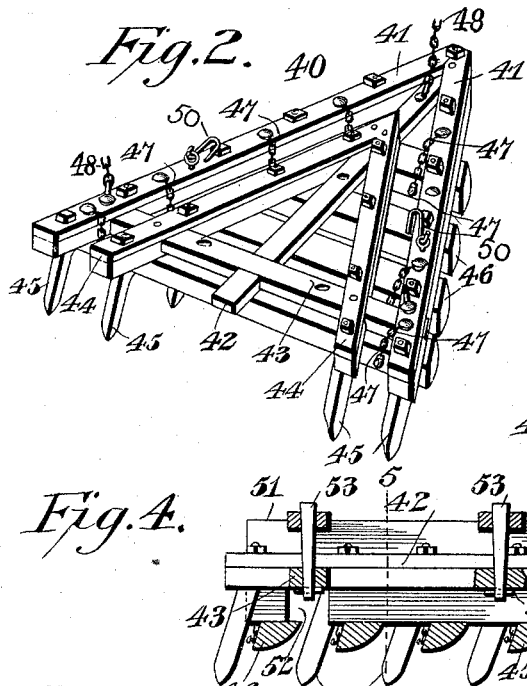
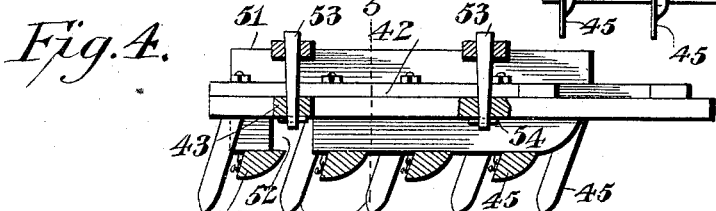
Witnesses
Jas. K. McLachran
H. J. Burchard
Inventor
William O. Phillips
By his Attorneys.
C. A. Snow & Co.

UNITED STATES PATENT OFFICE.

WILLIAM O. PHILLIPS, OF CALHOUN, KENTUCKY.

WHEELED HARROW.

SPECIFICATION forming part of Letters Patent No. 638,137, dated November 28, 1899.

Application filed January 20, 1899. Serial No. 702,834. (No model.)

*To all whom it may concern:*

Be it known that I, WILLIAM O. PHILLIPS, a citizen of the United States, residing at Calhoun, in the county of McLean and State of Kentucky, have invented a new and useful Wheeled Harrow, of which the following is a specification.

My invention relates to improvements in agricultural implements; and one object of said invention is to provide a rake mechanism which may be easily attached or removed and which is adapted to be raised or lowered by the driver seated on the frame.

A further object is to provide a harrow attachment which may be suspended and connected with lever devices for vertical adjustment thereby, and with this harrow attachment are associated drag-bars adapted to pulverize the clods, which drag-bars may be held down to their work by a simple device that is adapted to be used also for weighting the harrow-frame.

With these ends in view my invention consists in the novel combination of elements and in the construction and arrangement of parts, which will be hereinafter fully described and claimed.

To enable others to understand the invention, I have illustrated the preferred embodiment in the accompanying drawings, forming a part of this specification, and in which—

Figure 1 is a longitudinal section of the main frame with a harrow suspended therefrom. Fig. 2 is a detail perspective view of the harrow. Fig. 3 is a detail perspective view of the weight-frame. Fig. 4 is a sectional elevation of the harrow with the weight-frame applied thereto. Fig. 5 is a transverse section of the harrow on the line 5 5 of Fig. 4.

Like numerals of reference denote like and corresponding parts in each of the several figures of the drawings.

The implement of my invention contemplates the employment of a main frame 15, which is substantially rectangular in form and is constructed of side and cross sills which are firmly secured together. An axle 16 is arranged transversely across the main frame substantially midway between the front and rear cross-sills, and it is secured firmly to the side sills of said frame. The axle is angular in cross-section, preferably square, and at its ends it is constructed in any ordinary way to provide suitable spindles adapted to extend beyond the side rails of the frame. A pair of vertical parallel seat-standards 18 are secured firmly to the axle at or near the middle thereof, and these standards support the driver's seat 19. An operating-lever 23 is fulcrumed at one end on one of the seat-standards 18, and this operating-lever has a pitman 24 pivoted thereto. The frame is also equipped with a lever 27, which is fulcrumed, as at 28, to the other seat-standard, and this lever 27 and the pitman of the lever 23 are adapted to be connected operatively with a harrow-frame for the purpose of adjusting the latter vertically, as will hereinafter appear. The draft-tongue 29 is attached in any suitable way to the main frame 15, and this tongue is arranged preferably at one side of the middle of said frame, so that the doubletree 30 may be pivotally supported on a short bar 30ª, which is secured to the main frame. The carrying-wheels 38 are fitted to the spindles of the axle in order to support the main frame 15 and render the apparatus portable.

The harrow proper is suspended from the main frame 15 to occupy a horizontal position below the same, and this harrow attachment is designed to be connected with the lever 27 and the pitman of the lever 23 for the purpose of being adjusted thereby. The harrow-frame 40 consists of the inclined bars 41, which are secured firmly together at the front ends thereof; a longitudinal bar 42, disposed centrally between the inclined bars 41; a cross-bar 43, which is united to the longitudinal bar and to the inclined bars near the rear ends, and another pair of inclined bars 44, arranged within and parallel to the bars 41 and secured firmly to the bars 42 43. The plurality of teeth 45 are secured in staggered relation to the two pairs of inclined bars 41 44, and each tooth is constructed with a beveled or inclined working face, as shown by the drawings, for the purpose of throwing the dirt inwardly toward the central line of the harrow. A series of drag-bars 46 are arranged in the intervals between the harrow-teeth 45, and these drag-bars lie transversely across the harrow-frame in substantially parallel relation to each other. The drag-bars are loosely connected or suspended from the harrow-frame by means of the connecting-chains 47, a pair of which is provided for each drag-bar, and the drag-bars are thus adapted to have a limited play loosely between the teeth of the frame. The harrow-teeth depend below the drag-bars, so as to stir and pulverize the soil, while the drag-bars are adapted to break the clods, thereby securing increased efficiency of the harrow. The harrow is connected with the wheeled carrying-frame 15 by means of the suspending-chains 48, one of which is attached at or near the front end of the triangular frame, while two other chains are attached to said frame near the rear end thereof. The suspending-chains are intended to be fastened permanently to the harrow-frame, and the chains have hooks or rings which are to be engaged with suspension-hooks 49, provided on the front cross-rail and the axle of the wheeled main frame, whereby the harrow-frame may be connected detachably to said main frame. For the purpose of connecting the levers 23 27 to the harrow-frame I provide hooks 50 on the inclined bars 41 of the harrow-frame at points between the attachment of the suspension-chains thereto, and with these hooks may be detachably connected the lower end of the lever 27 and the pitman 24 of the lever 23. It is evident that these levers may be operated to raise the frame above the ground when the implement is to be moved to or from the field, and the entire harrow attachment may readily be disconnected from the frame 15 of the levers when the latter are to be used for other purposes.

In connection with the harrow attachment I provide a weight-frame 51, which may be used for the purpose of holding the drag-bars down to their work or of weighting the harrow-frame, or for both purposes. This weight-frame consists of inclined bars, which are connected by suitable cross-rails, and the angle of the bars of this weight-frame conforms to the space between the rails 41 44 of the harrow-frame, whereby the weight-frame may be fitted to the harrow-frame in the intervals between the pairs of inclined bars thereof. The weight-frame has its side bars notched at 52 to fit the cross-bar 43 of the harrow-frame for the purpose of letting the weight-frame down far enough for the side bars to engage with the drag-bars, and in practical service of the harrow attachment the weight-frame is constructed to engage with each of the drag-bars, except the front drag-bar, which is free or unconfined for the purpose of moving upwardly a sufficient distance to pass over large clods in its path. The cross-rails of the weight-frame have depending pins 53, which are adapted to support the keys 54, that may engage with the bars of the harrow-frame in order to make the weight-frame fast with said harrow-frame, and by connecting the weight-frame with the harrow-frame the latter may be weighted, so as to hold the same to its work. For the purpose of limiting the movement of the loosely-suspended drag-bars it is sufficient to fit the weight-frame between the inclined bars of the harrow-frame in order that said weight-frame may engage with the drag-bars; but to hold down the harrow-frame itself the weight-frame should be keyed to said harrow-frame.

Changes may be made in the form and proportion of some of the parts, while their essential features are retained and the spirit of the invention embodied. Hence I do not desire to be limited to the precise form of all the parts as shown, reserving the right to vary therefrom.

Having thus described the invention, what I claim is—

1. An agricultural implement consisting of a frame, a harrow arranged below said frame and provided with lifting-hooks, levers fulcrumed on the frame and arranged for their lower ends to be connected directly and detachably to said hooks of the harrow, and suspension-chains attached to the frame and the harrow, said chains being fastened to the harrow on opposite sides of the lever connections therewith, substantially as described.

2. In an agricultural implement, the combination with a harrow frame having the teeth, of drag-bars arranged between said teeth, and a weight-frame engaging with said drag-bars to limit the upward movement thereof with relation to the harrow-frame, substantially as described.

3. In an agricultural implement, a harrow provided with a series of loosely-suspended drag-bars arranged in the intervals between the harrow-teeth, and a weight-frame fitted to the harrow-frame and engaging with the drag-bars, substantially as described.

4. In an agricultural implement, a harrow consisting of a frame provided with the teeth, drag-bars loosely suspended from the frame, a weight-frame fitted removably to the harrow-frame, and devices for making the weight-frame fast with the harrow-frame, substantially as described.

In testimony that I claim the foregoing as my own I have hereto affixed my signature in the presence of two witnesses.

WM. O. PHILLIPS.

Witnesses:
F. A. LOCHRY,
B. F. WARREN.